(12) United States Patent
Carrere

(10) Patent No.: US 10,334,403 B2
(45) Date of Patent: Jun. 25, 2019

(54) DATA COMMUNICATION METHOD BETWEEN A PLURALITY OF AIRCRAFT

(71) Applicant: THALES, Neuilly sur Seine (FR)

(72) Inventor: Patrice Carrere, Gennevilliers (FR)

(73) Assignee: THALES, Neuilly Sur Seine (FR)

( * ) Notice: Subject to any disclaimer, the term of this patent is extended or adjusted under 35 U.S.C. 154(b) by 822 days.

(21) Appl. No.: 14/448,543

(22) Filed: Jul. 31, 2014

(65) Prior Publication Data

US 2016/0366563 A1     Dec. 15, 2016

(30) Foreign Application Priority Data

Aug. 1, 2013 (FR) .................................... 13 01856

(51) Int. Cl.
| | |
|---|---|
| *H04L 12/46* | (2006.01) |
| *H04W 4/04* | (2009.01) |
| *H04B 7/185* | (2006.01) |
| *H04L 12/741* | (2013.01) |
| *H04L 12/931* | (2013.01) |
| *H04W 40/22* | (2009.01) |
| *H04L 29/12* | (2006.01) |
| *H04L 29/06* | (2006.01) |

(52) U.S. Cl.
CPC ........ *H04W 4/046* (2013.01); *H04B 7/18506* (2013.01); *H04L 45/745* (2013.01); *H04L 49/201* (2013.01); *H04W 40/22* (2013.01); *H04L 12/4641* (2013.01); *H04L 61/6022* (2013.01); *H04L 69/22* (2013.01)

(58) Field of Classification Search
CPC .. H04W 4/046; H04W 40/22; H04B 7/18506; H04L 45/745; H04L 49/201; H04L 12/4641; H04L 61/6022; H04L 69/22

USPC ........................................................ 455/431
See application file for complete search history.

(56) References Cited

U.S. PATENT DOCUMENTS

| | | | | |
|---|---|---|---|---|
| 6,160,998 | A * | 12/2000 | Wright | ............... H04B 7/18506 340/945 |
| 6,167,238 | A * | 12/2000 | Wright | ................ H04W 52/283 340/3.3 |
| 7,937,438 | B1 * | 5/2011 | Miller | ..................... H04L 41/12 370/397 |

(Continued)

FOREIGN PATENT DOCUMENTS

| EP | 2 051 406 | 4/2009 |
|---|---|---|
| EP | 2 592 870 | 5/2013 |

OTHER PUBLICATIONS

French Search Report dated Feb. 26, 2014, which issued during prosecution of French Application No. FR 1301856, which corresponds to the present application.

*Primary Examiner* — Charles N Appiah
*Assistant Examiner* — Xiang Zhang
(74) *Attorney, Agent, or Firm* — Troutman Sanders LLP

(57) ABSTRACT

The invention relates to a data communication method between a plurality of aircraft from a set of aircraft, the aircraft being organized according to a plurality of telecommunications, notably radio telecommunication networks, connected to each other through relay stations, each telecommunication network being provided with an identifier specific to the network, the method comprising a step for adding pieces of information in the data to be emitted from an aircraft belonging to a first network of aircraft, the pieces of information comprising the identifier specific to the first network.

8 Claims, 6 Drawing Sheets

(56) References Cited

U.S. PATENT DOCUMENTS

| | | |
|---|---|---|
| 2003/0152075 A1 | 8/2003 | Hawthorne, III et al. |
| 2007/0171904 A1 | 7/2007 | Tchigevsky |
| 2008/0117858 A1* | 5/2008 | Kauffman .......... H04B 7/18504 370/316 |
| 2008/0151876 A1* | 6/2008 | Wilson ................ H04L 65/1069 370/352 |
| 2009/0003221 A1 | 1/2009 | Burns et al. |
| 2009/0103473 A1* | 4/2009 | Foster ................ H04B 7/18584 370/316 |
| 2009/0141669 A1* | 6/2009 | Kauffman .......... H04W 40/246 370/328 |
| 2009/0318137 A1* | 12/2009 | Kauffman .............. H04L 45/42 455/428 |
| 2010/0020809 A1 | 1/2010 | Jones et al. |
| 2010/0087190 A1* | 4/2010 | Pandit ................ H04B 7/18506 455/431 |
| 2010/0195634 A1* | 8/2010 | Thompson .......... H04W 36/385 370/338 |
| 2010/0278048 A1* | 11/2010 | Sawaguchi ......... H04L 12/4625 370/241.1 |
| 2010/0281100 A1* | 11/2010 | Benco ................ B64D 11/0015 709/203 |
| 2011/0194541 A1* | 8/2011 | Menaceur ......... H04L 29/12452 370/338 |
| 2013/0121321 A1 | 5/2013 | Backes |

\* cited by examiner

DATA COMMUNICATION METHOD BETWEEN A PLURALITY OF AIRCRAFT

CROSS-REFERENCE TO RELATED APPLICATIONS

The present application claims priority to French Application No. 13 01856 filed Aug. 1, 2013. This application is incorporated by reference herein.

FIELD OF THE INVENTION

The present invention relates to a method for data communication between a plurality of aircraft. The present invention also relates to a set of aircraft able to apply the communications method.

BACKGROUND

Within the field of aeronautical communications, a radio bubble is defined by the set of platforms within radio reach from each other. When a mission implies a plurality of platforms or the crossing of mountainous areas involving geographical masking operations, several radio bubbles coexist. A helicopter in a tactical flight at the bottom of a valley generally forms a radio bubble isolated from a certain number of platforms of the patrol which is related to the presence of mountains around the helicopter.

A radio relay between these platforms is then applied in order to increase the range of the exchanges between platforms or dealing with geographical masking operations. When a radio relay is set up, this means that a designated platform aims at re-emitting received data with the goal that two platforms which are not within radio reach of each other may communicate together.

However, the presence of such a radio relay poses problems within the scope of unicast and multicast data communications in the form of IP packets or Ethernet frames. The term of unicast defines a point-to-point network connection, i.e. from an emitter to a (single) receiver while the term of multicast (which is expressed by the expression « multi-broadcasting ») is a form of broadcasting from an emitter (single source) to a group of receivers. The terms of «multi-point broadcasting» or «group broadcasting» are also used.

In a unicast mode, multiple reception of data is observed when an aircraft intermittently belongs to a radio bubble for which a relay is applied (the aircraft is not assumed to be within reach of the other aircraft of this radio bubble). In a multicast mode, multiple receptions of data occur when one or several aircraft are both within radio reach of the aircraft emitting the multicast data flow and of a relay station. Multiple reception of data is all the more a problem since it involves specific processing at the application level (in order to suppress the receipt of data several times) while the world of applications is, by nature, agnostic about broadcasting mechanisms and delivery mechanisms of underlying data.

Therefore there exists a need for a method for communicating data between a plurality of aircraft involving less application resources for its application.

SUMMARY

For this purpose, the object of the invention is a data communication method between a plurality of aircraft from a set of aircraft, the aircraft being organized according to a plurality of telecommunication networks, notably radio telecommunication networks, connected together through relay stations, each telecommunication network being provided with an identifier specific to the network, the method having a step for adding the pieces of information into the data to be emitted from an aircraft belonging to a first aircraft network, the pieces of information including the identifier specific to the first network.

According to particular embodiments, the method comprises one or several of the following features, taken individually or according to all the technically possible combinations:
- each aircraft is provided with a specific identifier, the pieces of information comprising the identifier specific to each aircraft for which are intended the data to be emitted.
- the pieces of information include a piece of information relating to the unicast or multicast nature of the communication to be established with the data to be emitted.
- each relay station includes a relay unit between a first aircraft network and a second aircraft network, the method having a step for modifying the pieces of information added into the data, the identifier specific to the first network being replaced by the identifier specific to the second network, and a step for emitting the data by the relay unit when the communication to be established is of a multicast nature or when the communication to be established is of the unicast nature and when the aircraft for which are intended the data to be emitted, belongs to a network different from the network, for which the specific identifier is present in the data to be emitted.
- the data include a media access control layer, the step for adding pieces of information is applied by encapsulating pieces of information at the media access control layer of the data to be emitted.
- the method includes a data emission step by an aircraft belonging to the first aircraft network.
- the method includes a step for comparing the identifiers added into the data with the identifiers specific to the network of the second aircraft and to the second aircraft respectively.
- the method includes a step for acceptance by the second aircraft of receiving emitted data when the identifier is added into the data on the one hand and the identifiers respectively specific to the network of the second aircraft and to the second aircraft are identical on the other hand.
- the method includes a step for calculating the shortest path to be followed in order to forward the data from one aircraft to another aircraft.
- each telecommunications network is a virtual local network.
- the data appear in the form of at least one Ethernet frame and the pieces of information are encapsulated in a field of the header of said or each Ethernet frame.

The invention also relates to a set of aircraft in which the aircraft are organized according to a plurality of telecommunication networks, notably radio telecommunications networks, connected together through relay stations, each telecommunications network being provided with an identifier specific to the network, the set of aircraft being adapted for applying the communication method as described earlier.

BRIEF DESCRIPTION OF THE DRAWINGS

Other features and advantages of the invention will become apparent upon reading the description which follows of embodiments of the invention, only given as an example and with reference to the drawings wherein.

DETAILED DESCRIPTION

Figure 1:
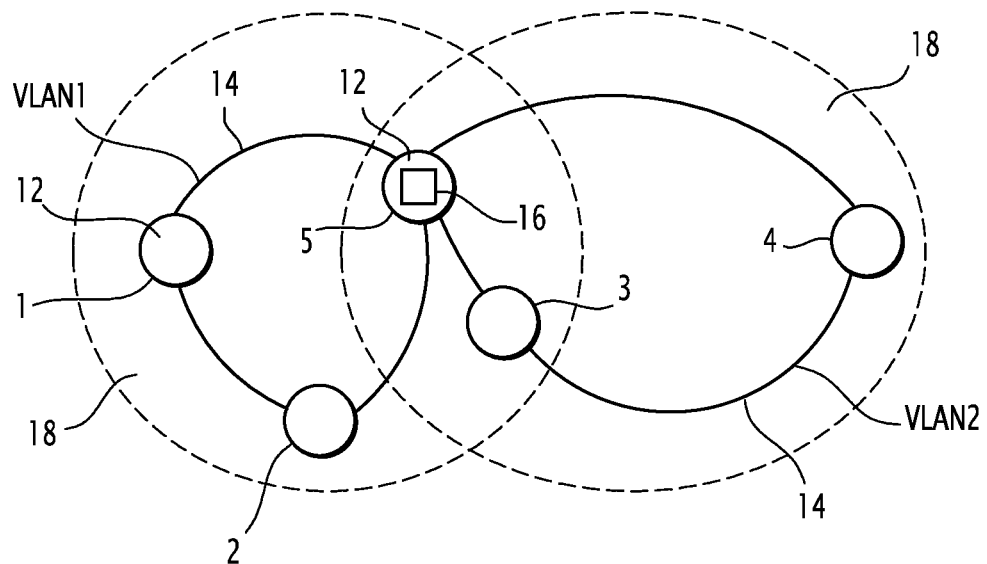
FIG. 1 is a schematic view of an example of a set of aircraft organized into communication networks.

A set 10 of aircraft 12 including a plurality of aircraft 12 is illustrated in FIG. 1.

An aircraft 12 is a transportation means capable of moving within the Earth's atmosphere. An aircraft is an aeronautical platform. As an example, an aircraft is a helicopter, an airplane, notably a fighter aircraft, a mission aircraft or a drone. Schematically, each aircraft 12 is illustrated by a circle in FIG. 1.

According to the example of FIG. 1, the set 10 includes five aircraft 12.

The aircraft 12 of the set 10 are organized according to a plurality of telecommunications networks 14 of the radio type.

By the expression «organized» is meant that each aircraft 12 belongs to at least one telecommunications network 14. Further, the term «organized» is related to an assignment of each aircraft 12 to a network. This assignment is different from the radio bubbles 18 which result as explained earlier from the proximity of the other aircraft, from the presence or not of an obstacle. In order to mark this difference, in FIG. 1, the networks 14 in the sense of the invention appear in solid lines connecting the aircraft 12 while the radio bubbles appear as a circle in dotted lines surrounding the aircraft 12 contained in the relevant radio bubble 18.

When the set 10 of the aircraft 12 is used for carrying out a military mission, the assignment of an aircraft 12 to a particular network 14 is determined during the preparation of the mission and depends on the imperatives of the mission.

For example, if three aircraft 12 have to collaborate, within the scope of their mission, the three aircraft 12 have to be in direct communication (assigned to the same network 14) or via a relay unit (assigned to distinct networks 14 connected through a relay unit 16).

The assignment of an aircraft 12 to the network 14 also depends on the topology of the locations overflown by the aircraft 12. Notably, the topology of the overflown locations has consequences on the aircraft 12 which are within radio reach of each other: through a mountain, radio waves are not transmitted. The aircraft 12 within radio reach of each other are preferably assigned to a same network 14.

The assignment is achieved by a particular unit. This unit is defined during the preparation of the mission and is unique for the set 10. More specifically, it is an aircraft 12 from the set of aircraft 12.

Alternatively, each aircraft 12 belongs to at most two networks 14.

According to an alternative, each aircraft 12 belongs to more than two networks 14.

Preferably, each aircraft 12 belonging to at least two networks 14 is a relay station. By definition, a relay station, also designated as a relay or a relay platform, ensures relay between two networks 14. In order to ensure the relay station function, in a way known per se, an aircraft 12 is provided with means allowing data to be relayed, called a relay unit 16 subsequently. As an example, the relay unit 16 is a computer. Further, each relay unit 16 is symbolized by a rectangle in FIG. 1.

A telecommunications network 14 is a subset of aircraft 12, i.e. each network 14 includes a portion of the aircraft 12 of the set 10. The aircraft 12 of the subset 10 are geographically away from each other, and are interconnected by telecommunications which allow exchange of data between the various aircraft 12.

In the considered examples, the telecommunications are telecommunications of the radio type. A radio telecommunication or radio communication is a telecommunication achieved in space by means of electromagnetic waves.

Preferably, as is the case for the set 10 of FIG. 1, each telecommunications network 14 is a local virtual network 14, commonly called a VLAN. VLAN is the acronym of the expression «Virtual Local Area Network». Subsequently, each network 14 of the set 10 is simply noted as a VLAN network 14.

A VLAN network 14 gives the possibility of separating the radio fluxes and of increasing security. Indeed, a VLAN network 14 is an independent and isolated, logic VLAN network 14, supported by the same radio network. The only means for communicating between the aircraft 12 belonging to different VLAN networks 14 is then to pass through a relay unit 16.

Each VLAN communication network 14 is provided with an identifier specific to the VLAN network 14.

As an example, an identifier is a number specific to the network. According to the example of FIG. 1, the five aircraft 12 are organized in two VLAN networks 14. With the first VLAN network 14 is associated the number 1 and with the second VLAN network 14 is associated the number 2. Among the aircraft 12, only the fifth aircraft 12 is a relay station provided with a relay unit 16 ensuring the relay between the first VLAN network 14 and the second VLAN network 14. The first VLAN network 14 includes the first aircraft 12, the second aircraft 12 and the fifth aircraft 12 while the second VLAN network 14 includes the third aircraft 12, the fourth aircraft 12 and the fifth aircraft 12.

By assigning an identifier to each aircraft 12, similar to the identifiers used for both VLAN networks 14, the following correspondence table may thus be established between the identifiers:

| Identifier of aircraft 12 | Identifier of the VLAN network 14 to which belongs the aircraft 12 |
|---|---|
| 1 | 1 |
| 2 | 1 |
| 3 | 2 |
| 4 | 2 |
| 5 | 1 and 2 |

The relay unit 16 is provided with this correspondence table. This for example means that the relay unit 16 includes a memory capable of storing such a correspondence table.

The relay unit 16 is further able to update the correspondence table. Such an update is for example achieved by defining several correspondence tables in the phase for preparing the mission. These different tables correspond to deployments of the different phases of the mission (group flight, first platform as reconnaissance, second and fourth aircraft in tactical flight at the bottom of the valley for example). In each of the cases, it is defined whether a relay has to be applied and which aircraft implements it and identifiers of networks are assigned to each aircraft 12 depending on these choices. This is a static method for taking into account planned topological developments. The passage from one table to another is controlled by the aircraft responsible for the assignment. Other updating methods may be contemplated such as dynamic allocations taking into account the actual radio bubbles 18.

Moreover it should be noted that, in the example of FIG. 1, two radio bubbles 18 coexist: the first aircraft 12, the second aircraft 12, the third aircraft 12 and the fifth aircraft 12 are part of a first radio bubble 18 while the third aircraft 12, the fourth aircraft 12 and the fifth aircraft 12 are part of a second radio bubble 18.

The operation of the set 10 of FIG. 1 is now described with reference to the application of a data communication method between two aircraft 12 in the following cases: unicast communication between two aircraft 12 of a same VLAN network 14 (illustrated by FIG. 2), unicast communication between two aircraft 12 of a different VLAN network 14 (illustrated by FIG. 3) and multicast communication (illustrated by FIG. 4).

First let us consider the case of unicast communication from the first aircraft 12 to the second aircraft 12. The first aircraft 12 and the second aircraft 12 belong to the first VLAN network 14.

The communication method in this case includes the addition of pieces of information in the data to be emitted by the first aircraft 12. The pieces of information comprise the identifier of the VLAN network 14 to which belongs the first aircraft 12.

In this case, the data to be emitted correspond to at least one Ethernet frame. Ethernet is a packet switching local network protocol. Ethernet is a protocol implementing the data link layers and the physical layers of the OSI model (according to the computer network standards IEEE 802.x). As an example, it is assumed that the whole of the data to be emitted corresponds to a single frame, the extension to several frames being straightforward.

The addition of the pieces of information is applied by encapsulating the pieces of information to be emitted in the Ethernet frames.

According to a preferred alternative, the encapsulation of the pieces of information is applied at the control sub-layer for accessing the medium.

The Media Access Control (MAC) sub-layer is the low half of the data link layer of the OSI model (according to the IEEE 802.x computer network standards). This sub-layer ensures the handling of the access to the physical medium, it is located above the physical (material) layer.

More specifically, it is proposed to use an optional field of the header of an Ethernet frame which is called a VLAN Identifier or VLAN ID. This optional field is provided by the IEEE 802.10 standard. In the following, this field is simply noted as VID. In this case, the identifier «1» is added into the field VID. In order to simplify in the following, it is noted as VID=1 in order to mean that the VID field contains the identifier «1» corresponding to the first VLAN network 14.

The frame is thus marked or «tagged» with the added pieces of information by encapsulation.

The method then includes the emission of the marked frame by the first aircraft 12.

The method then includes the receiving of the frame by all the aircraft 12 within radio reach of the first aircraft 12. According to the compositions of the radio bubbles 18, these are the second aircraft 12, the third aircraft 12 and the fifth aircraft 12.

The method then includes a step for having each aircraft 12 upon receiving the identifiers of the frame, check whether the aircraft 12 accepts or refuses the frame. In the following, by «reception» is meant the fact of capturing data and by «acceptance» or «reception accepted», the decision of sending captured data towards the upper layers of the OSI model for processing by the applications of the aircraft 12.

Each aircraft 12 upon reception first checks that the identifier specific to the VLAN network 14, to which belongs the relevant aircraft 12, is present in the header of the received frame. More specifically, it is checked for the second aircraft 12 that the frame includes the identifier of the first VLAN network 14 (i.e. VID=1) and for the third aircraft 12 that the frame includes the identifier of the second VLAN network 14 (i.e. VID=2) and for the fifth aircraft 12 that the frame includes the identifier of the first VLAN network 14 (i.e. VID=1) or the identifier of the second VLAN network (i.e. VID=2).

In the case of the third aircraft 12, as the frame does not include the identifier of the second VLAN network 14, the third aircraft 12 refuses the frame emitted by the first aircraft 12. This refusal is materialized in FIG. 2 by an arrow in dot-dash lines.

Only the second aircraft 12 and the fifth aircraft 12 identify an acceptable VLAN network 14 identifier. The method then includes a check of the address of the addressee. As the frame is intended for the second aircraft 12, the frame includes the identifier of the second aircraft 12. Consequently, the fifth aircraft 12 refuses the frame (see the arrow in dot-dash lines in FIG. 2) while the second aircraft 12 accepts the frame. This acceptance is materialized by an arrow in solid lines in FIG. 2.

Figure 2:
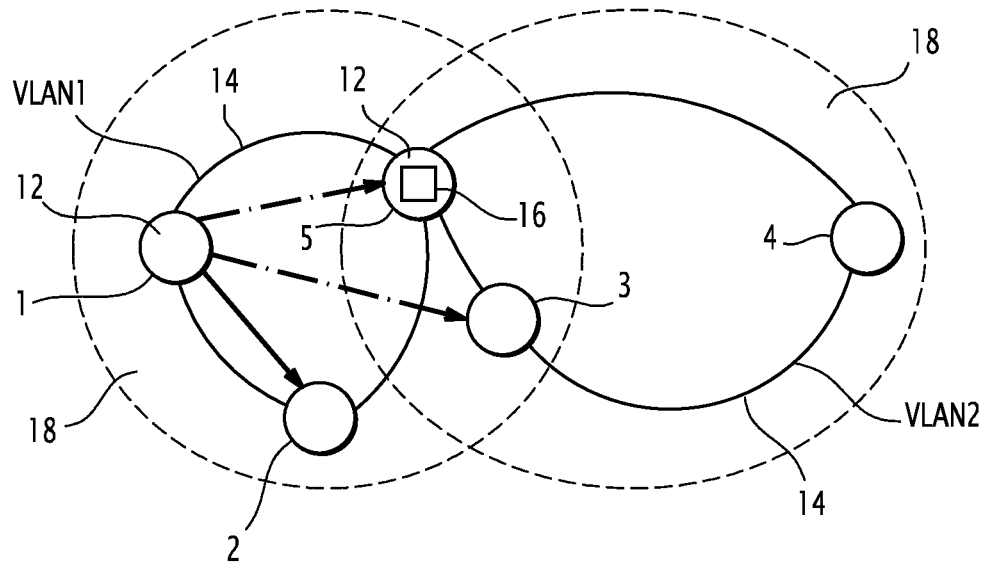
FIG. 2 is a schematic view of the example of a set of aircraft in a unicast communication situation between two aircraft of a same network.

The exemplary method illustrated by FIG. 2 corresponds to an intra-network communication, or more specifically, an intra-VLAN communication.

Next let us consider the case of a unicast communication from the first aircraft 12 to the third aircraft 12. The first aircraft 12 and the third aircraft 12 respectively belong to the first VLAN network 14 and to the second VLAN network 14.

The communication method is similar to the method applied in the case of FIG. 2. Only the differences are detailed in the following.

The method includes a step for encapsulating the pieces of information in a frame to be emitted by the first aircraft 12 at the header of the Ethernet frame. The pieces of information comprise the identifier of the VLAN network 14 to which belongs the first aircraft 12, i.e. VID=1 in this case, as well as the identifier of the destination aircraft 12, which is number 3.

The method then includes the emission of at least one frame marked by the first aircraft 12.

During the step for checking the received frame, the second aircraft 12 ascertains that the identifier is the identifier of the first VLAN network 14 but that the address of the addressee is not the one of the second aircraft 12. Consequently, the second aircraft 12 refuses the frame emitted by the first aircraft 12. This refusal is materialized in FIG. 3 by an arrow in dot-dash lines.

For the third aircraft 12, similarly to the case of FIG. 2, as the frame does not include the identifier of the second VLAN network 14, the third aircraft 12 refuses the frame emitted by the first aircraft 12. This refusal is materialized in FIG. 3 by an arrow in dot-dash lines.

On the contrary, for the fifth aircraft 12, similarly to the case of FIG. 2 for the first aircraft 12, as the frame includes the identifier of the first VLAN network 14 and the fifth aircraft 12 is a relay station, the method understands that the fifth aircraft 12 has accepted the frame emitted in order to be read. This acceptance is materialized in FIG. 3 by an arrow in solid lines.

The method then includes the comparison by the relay unit 16 of the match between the identifier associated with the VLAN network 14, to which belongs the destination aircraft 12 and the identifier of the frame emission VLAN network 14. This comparison is carried out by means of the correspondence table stored in memory in the relay unit 16.

In this case, the identifier associated with the VLAN network 14 to which belongs the destination aircraft 12 is the identifier of the second VLAN network 14 (the VLAN network 14 to which belongs the third aircraft 12) and the identifier of the frame emission VLAN network 14 is the identifier of the first VLAN network 14. In terms of VID, this is expressed by VID=2 for the identifier associated with the VLAN network 14 to which belongs the destination aircraft 12 and VID=1 for the identifier of the frame emission VLAN network 14.

Both identifiers are therefore distinct. Consequently, the relay unit 16 relays the frame emitted into the next VLAN network 14. This is a particular case of the calculation of the best path, a general case of which is detailed with reference to FIGS. 9 to 11. In the case when both identifiers are identical, the relay unit 16 does not re-transmit the received frame (case of intra-VLAN communication as described with reference to FIG. 2).

The method then includes the modification of the received frame by the fifth aircraft 12. The identifier of the frame is modified so that the new identifier is that of the VLAN network 14 into which the relay unit 16 intends to send the frame. In this case, the new identifier is the one of the second VLAN network 14, i.e. VID=2.

The method then includes the emission by the relay unit 16 of the modified frame.

For the first aircraft 12, as the frame no longer includes the identifier of the first VLAN network 14 but the identifier of the second VLAN network 14, the first aircraft 12 refuses the frame relayed by the relay unit 16. This refusal is materialized in FIG. 3 by an arrow in dash-dot lines. The same applies for the second aircraft 12.

The fourth aircraft 12 also receives the frame including the identifier of the second VLAN network 14. But, as the identifier of the destination aircraft 12 is that of the third aircraft 12, the fourth aircraft 12 refuses the frame relayed by the relay unit 16. This refusal is materialized in FIG. 3 by an arrow in dash-dot lines.

On the contrary, for the third aircraft 12, as the frame includes the identifier of the second VLAN network 14 and as the identifier of the destination aircraft 12 is that of the third aircraft 12, the method understands that the third aircraft 12 has accepted the frame emitted to be read. This acceptance is materialized in FIG. 3 by an arrow in solid lines.

The exemplary method illustrated by FIG. 2 corresponds to an inter-network operation commonly called inter-VLAN routing. The third aircraft 12 accepts only once the frame when the third aircraft 12 receives two frames from the first aircraft 12 either directly or via reemission by the fifth aircraft 12. Thus, there is no multiple or unnecessary acceptance of data. The result of this is that the communication method involves less application resources for its application.

Let us next consider the case of a multicast communication from the first aircraft 12.

The communication method is similar to the method applied in the case of FIG. 2. Only the differences are detailed in the following.

The method includes the encapsulation of pieces of information into a frame to be emitted by the first aircraft 12 at the access control sub-layer. The pieces of information comprise the identifier of the VLAN network 14 to which belongs the first aircraft 12, i.e. VID=1 in this case, as well as the nature of the communication, i.e. a multicast communication. In practice, the nature of the communication is a multicast Ethernet address present in the frame of the first aircraft 12.

The method includes after emission of at least one frame marked by the first aircraft 12.

Figure 3:
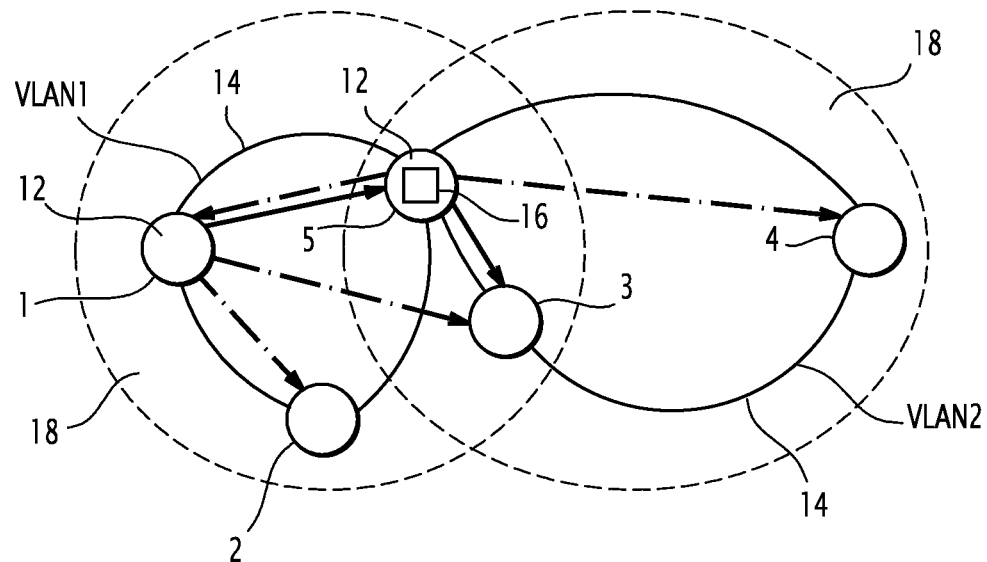
FIG. 3 is a schematic view of the example of a set of aircraft in a unicast communication situation between two aircraft of a different network.

Similarly to the cases of unicast communication presented with reference to FIGS. 2 and 3, as the frame does not include the identifier of the second VLAN network 14, the third aircraft 12 refuses the frame emitted by the first aircraft 12. This refusal is materialized in FIG. 4 by arrows in dot-dash lines.

On the contrary, as the frame includes the identifier of the first VLAN network 14, the second aircraft 12 and the fifth aircraft 12 accept the frame emitted by the first aircraft 12. These acceptances are materialized in FIG. 4 by arrows in solid lines.

The relay unit 16 identifies that the communication is a communication of the multicast type. Consequently, the relay unit 16 transmits the frame to the VLAN network 14 which is not the emission VLAN network 14. The identifier encapsulated in the frame gives the possibility of identifying this VLAN network 14, which in this case is the first VLAN network 14.

The relay unit 16 modifies the frame received by the fifth aircraft 12. The identifier of the frame is modified so that the new identifier is the one of the second VLAN network 14, i.e. VID=2.

The method then includes emission by the relay unit 16 of the modified frame.

Similarly to the cases of unicast communication presented with reference to FIGS. 2 and 3, as the frame does not include the identifier of the first VLAN network 14, the first aircraft 12 and the second aircraft 12 refuse the frame emitted by the fifth aircraft 12. These refusals are materialized in FIG. 4 by arrows in dash-dot lines.

On the contrary, as the frame includes the identifier of the second VLAN network 14, the third aircraft 12 and the fourth aircraft 12 accept the frame emitted by the fifth aircraft 12. These acceptances are materialized in FIG. 4 by arrows in solid lines.

At the end of the multicast communication, although all the aircraft 12 are within radio range of the transmitter or not, each aircraft 12 has accepted the original frame emitted by the first aircraft 12, at most once. More specifically, the second aircraft 12 has received the frame directly from the first aircraft 12. The third aircraft 12 has received the frame via the relay of the relay unit 16 of the fifth aircraft 12. Also, the fourth aircraft 12 has received the frame via the relay of the relay unit 16 of the fifth aircraft 12. The fifth aircraft 12 has received the frame directly from the first aircraft 12. There is no multiple or unnecessary data transmission. The result of this is that the communication method involves less application resources for its application. The result of this is that each relay station is «transparent». Whether the aircraft 12 belong to the same radio bubble 18 as the radio bubble 18 of the single aircraft 12 or not which initially transmits the frame, each aircraft 12 only accepts the frame once. Making the relay stations «transparent» virtually amounts to ensuring that all the aircraft belong to the same radio bubble 18.

Figure 5:
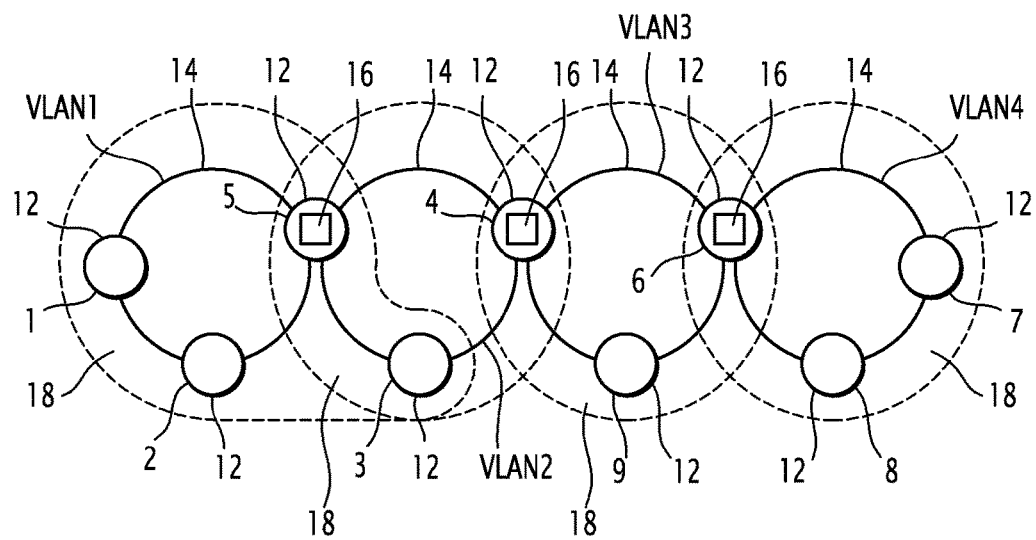
FIG. 5 is a schematic view of another example of a set of aircraft organized in communication networks.

A second example of a set 10 of aircraft 12 including a plurality of aircraft 12 is illustrated in FIG. 5. The set 10 is similar to the set 10 shown with reference to FIG. 1. Only the differences are underlined in the following.

In the case of FIG. 5, the set 10 includes nine aircraft 12 distributed in four distinct telecommunication VLAN networks 14. The fourth aircraft 12, the fifth aircraft 12 and the sixth aircraft 12 comprise relay stations.

The first VLAN network 14 includes the first aircraft 12, the second aircraft 12 and the fifth aircraft 12; the second VLAN network 14 includes the third aircraft 12, the fourth aircraft 12 and the fifth aircraft 12; the third VLAN network 14 includes the fourth aircraft 12, the sixth aircraft 12 and the ninth aircraft 12 and the fourth VLAN network 14 includes the sixth aircraft 12, the seventh aircraft 12 and the eighth aircraft 12.

The relay stations of the fourth aircraft 12, of the fifth aircraft 12 and of the sixth aircraft 12 are thus provided with the following correspondence table:

| Number of the aircraft 12 | Identifier of the associated VLAN network 14 |
|---|---|
| 1 | 1 |
| 2 | 1 |
| 3 | 2 |
| 4 | 2 and 3 |
| 5 | 1 and 2 |
| 6 | 3 and 4 |
| 7 | 4 |
| 8 | 4 |
| 9 | 3 |

Figure 7:
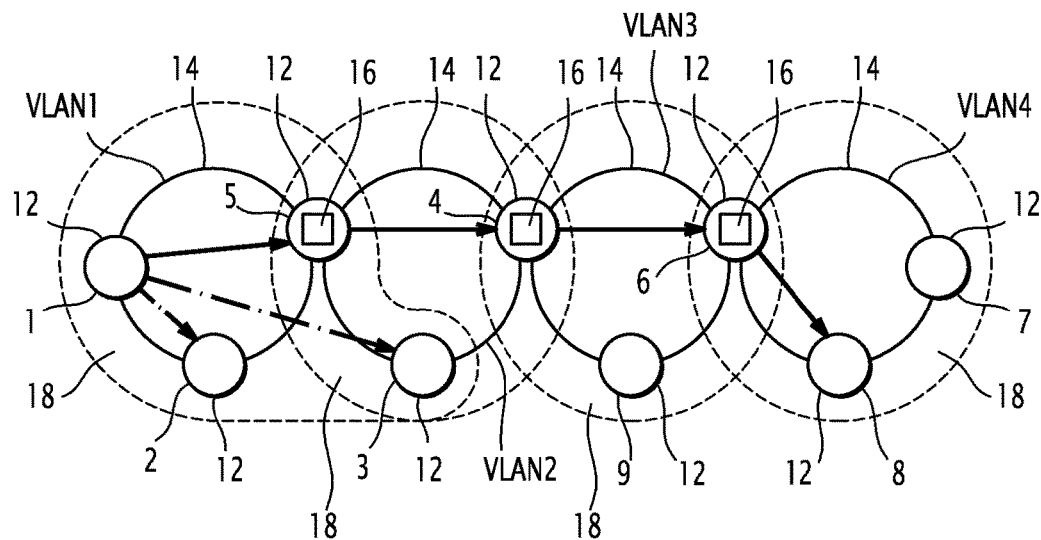
FIG. 7 is a schematic view of the other example of a set of aircraft in a unicast communication situation between two aircraft of a different network.
Figure 8:
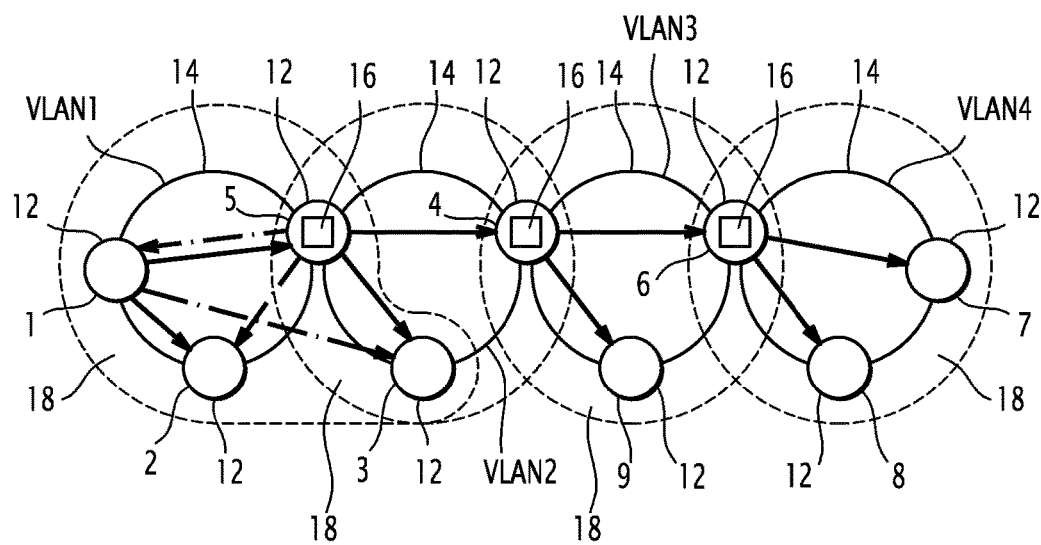
FIG. 8 is a schematic view of the other example of a set of aircraft in a multicast communication situation.

The operation of the set 10 of FIG. 5 is now described with reference to the application of a data communication method between two aircraft 12 in the following cases: unicast communication between two aircraft 12 of a same VLAN network 14 (illustrated by FIG. 6), unicast communication between two aircraft 12 of a different VLAN network 14 (illustrated by FIG. 7) and multicast communication (illustrated by FIG. 8). These examples give the possibility of illustrating that there is no multiple or unnecessary acceptance of data by the aircraft.

Figure 6:
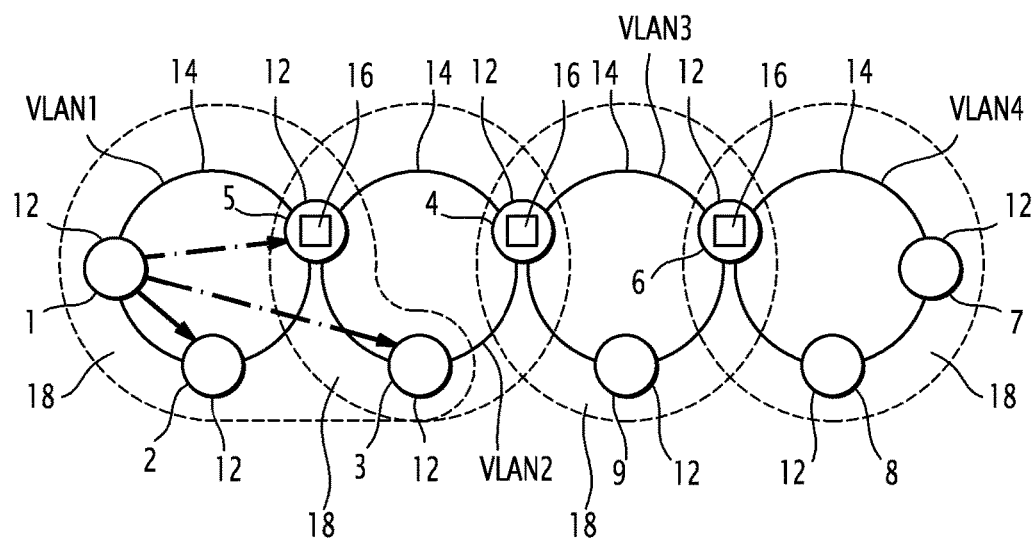
FIG. 6 is a schematic view of the other example of a set of aircraft in a unicast communication situation between two aircraft of a same network.

For the case of an inter-VLAN routing illustrated by FIG. 6, a method identical with the one described with reference to FIG. 2 is applied.

Next, let us consider the case of a unicast communication from the first aircraft 12 to the eighth aircraft 12. The first aircraft 12 and the eighth aircraft 12 respectively belong to the first VLAN network 14 and to the fourth VLAN network 14. The method includes the encapsulation of the pieces of information in the frames to be emitted by the first aircraft 12 at the header of the Ethernet frame. The pieces of information comprise the identifier of the VLAN network 14 to which belongs the first aircraft 12, i.e. VID=1 in this case, as well as the identifier of the destination aircraft 12 which is number 8.

The method then includes the emission of at least one marked frame by the first aircraft 12.

Although the frame includes the identifier of the first VLAN network 14, the second aircraft 12 refuses the frame because the identifier of the destination aircraft 12 is that of the eighth aircraft 12 and not the one of the second aircraft 12.

As the frame does not include the identifier of the second VLAN network 14, the third aircraft 12 refuses the frame emitted by the first aircraft 12. This refusal is materialized in FIG. 7 by an arrow in dash-dot lines. On the contrary, for the fifth aircraft 12, as the frame includes the identifier of the first VLAN network 14 and the fifth aircraft 12 is a relay station, the method includes a step for having the fifth aircraft 12 accept the frame emitted to be read. This acceptance is materialized in FIG. 7 by the arrow in solid lines.

The method then includes the comparison by the relay unit 16 of the match between the identifier associated with the VLAN network 14 to which belongs the destination aircraft 12 and the identifier of the VLAN network 14 having emitted the frame. This comparison is carried out by means of the correspondence table stored in memory in the relay unit 16.

In this case, the identifier associated with the VLAN network 14 to which belongs the destination aircraft 12 is the identifier of the fourth VLAN network 14 (the VLAN network 14 to which belongs the eighth aircraft 12) and the identifier of the frame emission VLAN network 14 is the identifier of the first VLAN network 14. In terms of VID, this is expressed by VID=4 for the identifier associated with the VLAN network 14 to which belongs the destination aircraft 12 and VID=1 for the identifier of the VLAN network 14 having emitted the frame.

Both identifiers are therefore distinct. This implies that the relay unit 16 has to relay the emitted frame in at least one aircraft 12 of the next VLAN network 14. This is a particular case of the calculation of the best path, a general case of which is detailed with reference to FIGS. 9 to 11.

The method then includes the emission by the relay unit 16 of the modified frame to the fourth aircraft 12.

The fourth aircraft 12 then transmits the frame to the sixth aircraft 12 by changing the VID to 3.

Also, the sixth aircraft 12 then transmits the frame to the eight aircraft 12 while changing the VID to 4.

As the frame includes the identifier of the fourth VLAN network 14 and as the identifier of the destination aircraft 12 is the identifier of the eight aircraft 12, the eighth aircraft 12 accepts the frame emitted by the sixth aircraft 12 (which includes the data of the frame emitted by the first aircraft) for reading. This acceptance is materialized in FIG. 7 by an arrow in solid lines.

Similarly to the previous cases, there is no unnecessary acceptance of data by the aircraft 12. The result of this is that the communication method involves less application resources for its application.

Figure 4:
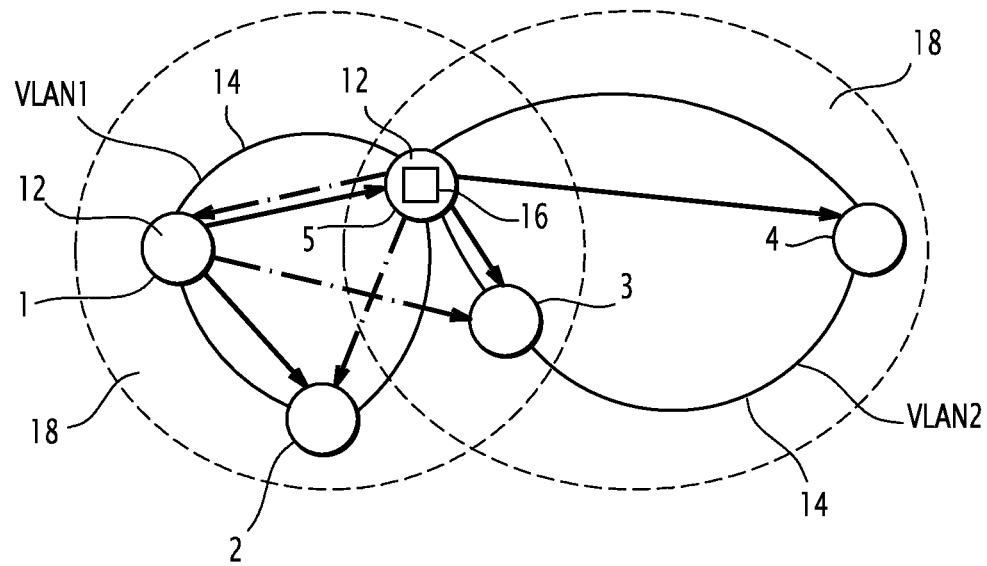
FIG. 4 is a schematic view of the example of a set of aircraft in a multicast communication situation.

For the case of a multicast communication illustrated by FIG. 8, a method identical to the one described with reference to FIG. 4 is applied.

Again, there is no multiple or unnecessary acceptance of data by the aircraft 12. The result of this is that the communication method involves less application resources for its application.

Figure 9:
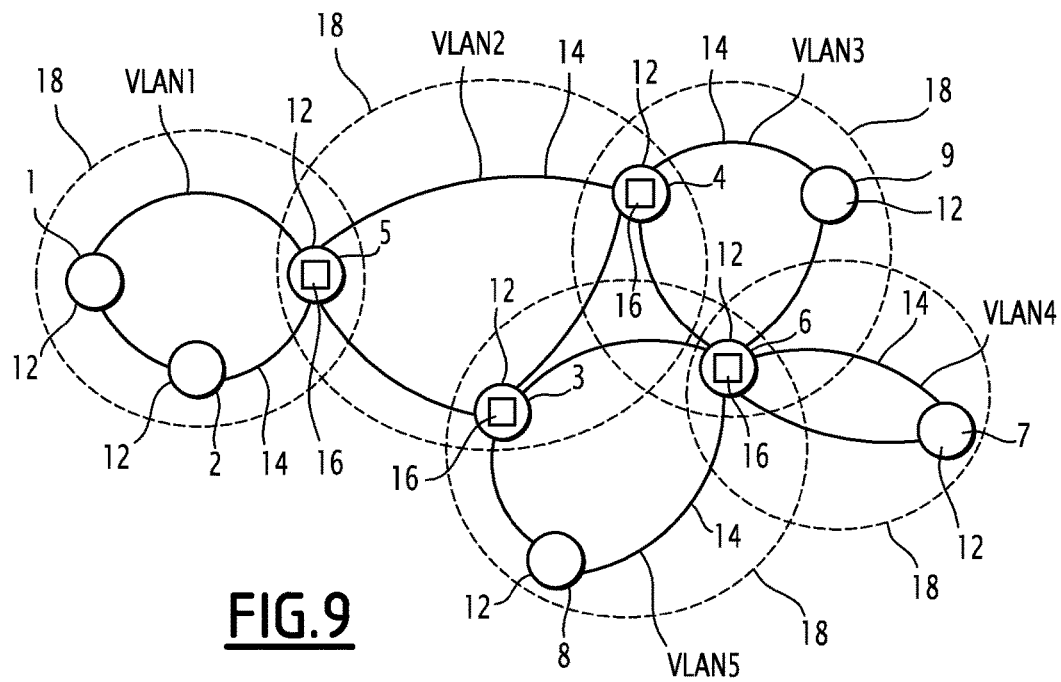
FIG. 9 is a schematic view of a further example of a set of aircraft organized in communication networks.

A third example of a set 10 of aircraft 12 including a plurality of aircraft 12 is illustrated in FIG. 9. The set 10 is similar to the set 10 shown with reference to FIG. 1. Only the differences are underlined in the following.

In the case of FIG. 9, the set 10 includes nine aircraft 12 distributed in five distinct VLAN telecommunication networks 14. The third aircraft 12, the fourth aircraft 12, the fifth aircraft 12 and the sixth aircraft 12 are relay stations each comprising a relay unit 16.

The first VLAN network 14 includes the first aircraft 12, the second aircraft 12 and the fifth aircraft 12; the second VLAN network 14 includes the third aircraft 12, the fourth aircraft 12 and the fifth aircraft 12; the third VLAN network 14 includes the fourth aircraft 12, the sixth aircraft 12 and the ninth aircraft 12; the fourth VLAN network 14 includes the sixth aircraft 12, the seventh aircraft 12 and the fifth VLAN network 14 includes the third aircraft 12, the sixth aircraft 12 and the eighth aircraft 12. As indicated by the match between the circles in solid lines and the circles in dotted lines, the five radio bubbles 18 and the VLAN networks comprise in the specific example of FIG. 9, the same aircraft.

The relay unit 16 of the third aircraft 12, of the fourth aircraft 12, of the fifth aircraft 12 and of the sixth aircraft 12, are thus provided with the following correspondence table:

| Number of the aircraft 12 | Identifier of the associated VLAN network 14 |
|---|---|
| 1 | 1 |
| 2 | 1 |
| 3 | 2 and 5 |
| 4 | 2 and 3 |
| 5 | 1 and 2 |
| 6 | 3, 4 and 5 |
| 7 | 4 |
| 8 | 5 |
| 9 | 3 |

Figure 10:
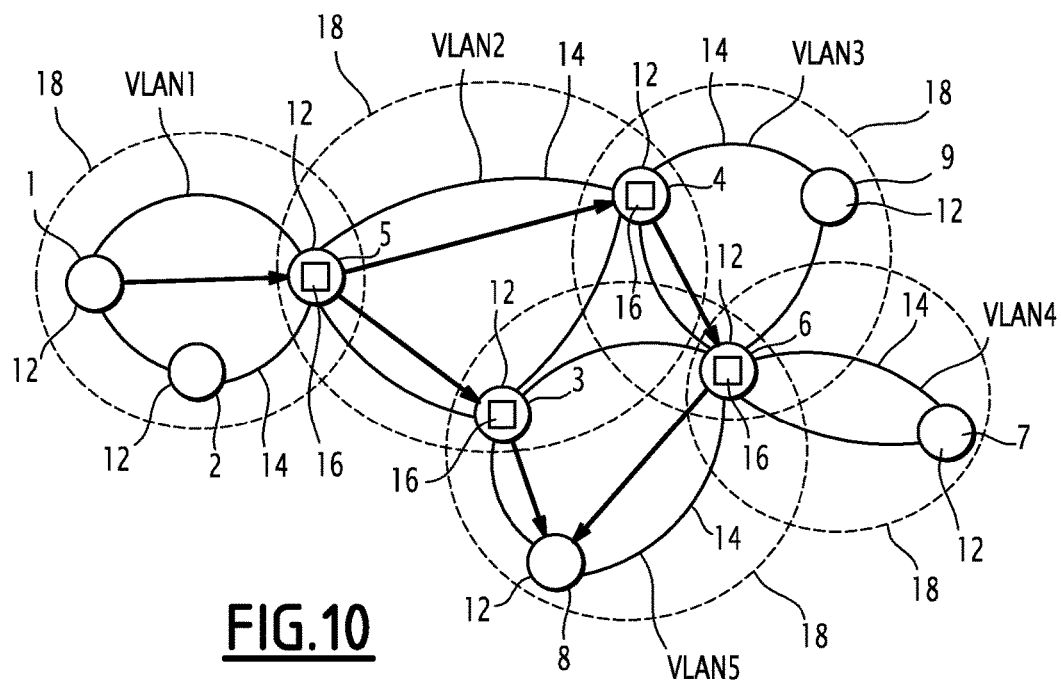
FIG. 10 is a schematic view of communication paths connecting the first aircraft to the eighth aircraft in the case of the further example.
Figure 11:
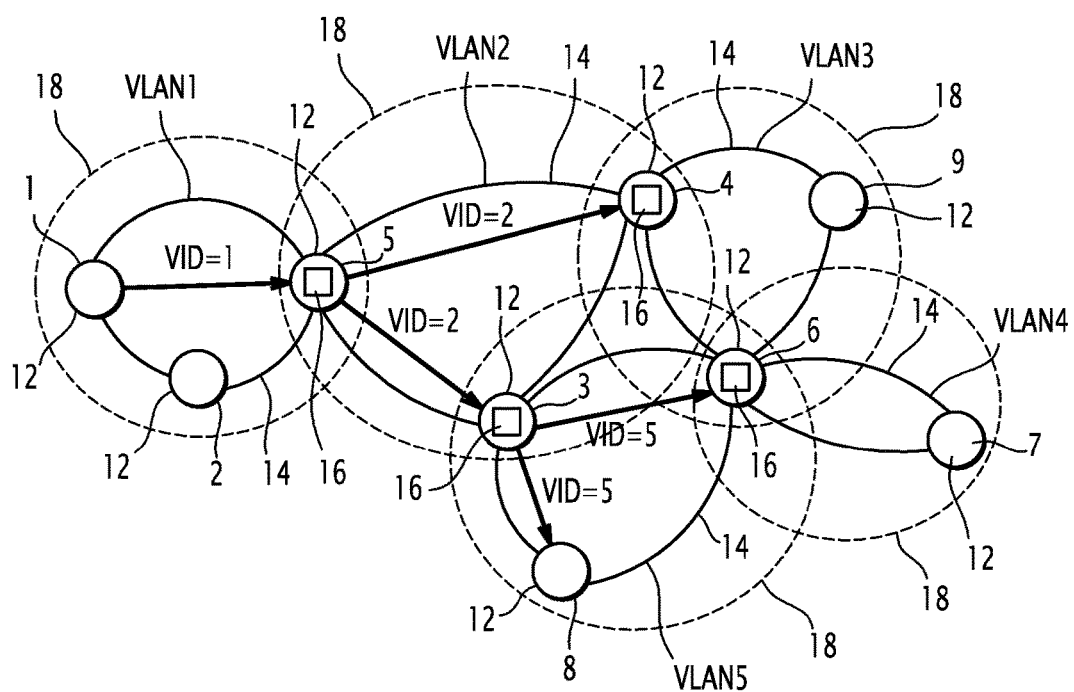
FIG. 11 is a schematic view of the further example of a set of aircraft in a unicast communication situation between two aircraft of a different network.

As the examples of FIGS. 5 to 8 have given the possibility of illustrating that there is no multiple or unnecessary acceptance of data by the aircraft even in the presence of several relay stations, the example of FIG. 9 will not be used for showing this point even if this remains true. On the other hand, with reference to FIGS. 10 and 11, a communication method in which the relay stations carry out a calculation of the best path for minimizing the radio resources involved in the communication of the frame. As explained earlier, the calculation of the best path may also be applied in all the illustrated cases through the different FIGS. 1 to 8. Each relay unit 16 calculates the best path. This calculation is trivial in the first examples of FIGS. 1 to 4 in the presence of two VLAN networks 14. It is simple within the scope of FIGS. 5 to 8 since only one possible path exists between two aircraft 12. In FIGS. 10 and 11, a more complex case is shown when several paths exist. These examples also give the possibility of showing that preferably the calculation of the best path is a generic algorithm based on the correspondence table which is applied by all the relay units 16 independently of the organization of the aircraft 12 into VLAN networks 14.

FIG. 10 corresponds to the case of a unicast communication from the first aircraft 12 to the eighth aircraft 12. The first aircraft 12 and the eighth aircraft 12 respectively belong to the first VLAN network 14 and to the fifth VLAN network 14.

FIG. 10 shows that two paths may be contemplated. According to the first path indicated in dotted lines, the frame follows the following path: fifth aircraft 12—fourth aircraft 12—sixth aircraft 12—eighth aircraft 12. According to the second path indicated by solid lines, the frame follows the following path: fifth aircraft 12—third aircraft 12—eighth aircraft 12. The second path minimizes the number of relays between the first aircraft 12 and the eighth aircraft 12. The second path is therefore the shortest path.

A relay unit 16 is able to determine the best path on the basis of the correspondence table. When a relay unit 16 receives a frame with, for the destination address, the destination address of the eight aircraft 12, the relay unit 16 is capable of determining whether the aircraft 12 comprising the relay unit 16 is part of the best path or not. In the case when the aircraft 12 is on the best path, the relay unit 16 re-transmits the frame in the VLAN network 14 which follows on the first path of the relay unit 16. In the opposite case, the aircraft 16 is content with rejecting the frame. This is schematically illustrated by FIG. 11 in which the fourth aircraft 12 and sixth aircraft 12 reject the frame because these aircraft 12 are not part of the best path between the first aircraft 12 and the eighth aircraft 12.

The proposed method therefore allows minimization of the number of relays, which minimizes the number of re-emissions between the first aircraft 12 and the eighth aircraft 12. The result of this is that the number of resources involved for establishing a communication between the first aircraft 12 and the eighth aircraft 12 is minimized.

The best path calculation is also generalized to the case of a multicast communication. In this case, a broadcasting rule is selected in order to avoid transmitting twice the same frame to the same aircraft 12 through two different paths which would lead to multiple frame acceptances. For example, as a broadcasting rule, it is selected to always start again with the VLAN network 14 having the smallest identifier when the relay unit 16 performs the calculation of a best path. Other broadcasting rules may also be contemplated.

Thus, in all the proposed embodiments, the application of the method does not imply the use of additional elements, such as dedicated radio resources. A radio transmitter station, specific frequencies are examples of such radio resources. This makes the application of the method easier. This advantage is all the more important within the context of preparing a mission, in which the aircraft 12 have limited radio resources.

Further, in all the proposed embodiments, the application of the data communication method involves less application resources.

In a preferred embodiment, it is proposed to apply VLAN networks 14 for logically partitioning subsets of aircraft 12 on the same physical medium of the waveform.

The method thus proposes the use of a technique widespread in the field of company VLAN networks 14, adapted to a different field which is that of radio relays. This adaptation is specific. Thus, the VIDs are allocated dynamically instead of statically. More specifically, the VIDs are allocated depending on the topology of the VLAN networks 14. Further, the inter-VLAN routing is a level 2 routing based on the Ethernet address of the addressee and the VID, as compared with usual IP routing.

The invention claimed is:

1. A data communication method between a plurality of aircraft of a set of aircraft, the aircraft being organized according to a plurality of wireless telecommunications networks connected together through relay stations, each relay station includes a relay unit between a first wireless telecommunications network of aircraft and a second wireless telecommunications network of aircraft, each wireless telecommunications network being provided with an identifier specific to the network, the method comprising the steps of: adding pieces of information into data to be emitted from an aircraft belonging to a first wireless telecommunications network of aircraft, the pieces of information comprising the identifier specific to the first wireless telecommunications network; modifying the pieces of information added into the data, the identifier specific to the first wireless telecommunications network being replaced with the identifier specific to the second wireless telecommunications network, emitting the data through the relay unit when the communication to be established is of a multicast nature or when the communication to be established is of a unicast nature and the aircraft for which the data to be emitted are intended belongs to a wireless telecommunications network different from the wireless telecommunications network whose specific identifier is present in the data to be emitted; providing each aircraft with a specific identifier, the pieces of information comprising the specific identifier of each aircraft for which the data to be emitted are intended; emitting the data by an aircraft belonging to the first wireless telecommunications network of aircraft; comparing the identifiers added in the data with the identifiers respectively specific to the wireless telecommunications network of the second aircraft and to the second aircraft; and having the second aircraft accept receiving the emitted data when the identifiers added into the data on the one hand and the identifiers respectively specific to the wireless telecommunication network of the second aircraft and to the second aircraft are identical, wherein the modification step is performed by the relay unit.

2. The method according to claim 1, wherein the pieces of information comprise a piece of information relating to the unicast or multicast nature of the communication to be established with the data to be emitted.

3. The method according to claim 1, wherein the data include a media access control layer, the step of adding pieces of information is applied by encapsulation of the pieces of information at the media access control layer of the data to be emitted.

4. The communication method according to claim 1, further comprising, a step of calculating the shortest path to be followed for forwarding the data from one aircraft to another aircraft.

5. The communication method according to claim 1, wherein each wireless telecommunication network is a virtual local network.

6. The communication method according to claim 1, wherein the data appear in the form of at least one Ethernet frame and the pieces of information are encapsulated in a field of the header of said or each Ethernet frame.

7. A set of aircraft wherein the aircraft are organized according to a wireless telecommunications networks connected to each other through relay stations, each wireless telecommunication network being provided with an identifier specific to the wireless telecommunications network, the set of aircraft being adapted for applying the communication method according to claim 1.

8. The communication method according to claim 1, wherein the relay units are aircraft of the set of aircraft.

* * * * *